(12) United States Patent
Gaus et al.

(10) Patent No.: US 10,722,915 B2
(45) Date of Patent: Jul. 28, 2020

(54) VALVE

(71) Applicant: AptarGroup, Inc., Crystal Lake, IL (US)

(72) Inventors: Dave Gaus, Saginaw, MI (US); Eric O'Boyle, Breckenridge, MI (US)

(73) Assignee: AptarGroup, Inc., Crystal Lake, IL (US)

( * ) Notice: Subject to any disclaimer, the term of this patent is extended or adjusted under 35 U.S.C. 154(b) by 206 days.

(21) Appl. No.: 15/758,069

(22) PCT Filed: Oct. 23, 2017

(86) PCT No.: PCT/US2017/057790
§ 371 (c)(1),
(2) Date: Mar. 7, 2018

(87) PCT Pub. No.: WO2019/083492
PCT Pub. Date: May 2, 2019

(65) Prior Publication Data
US 2019/0358667 A1  Nov. 28, 2019

(51) Int. Cl.
*B05C 17/005* (2006.01)
*B65D 47/10* (2006.01)
(Continued)

(52) U.S. Cl.
CPC ............ *B05C 17/005* (2013.01); *B65D 47/10* (2013.01); *B65D 47/2031* (2013.01);
(Continued)

(58) Field of Classification Search
CPC .. B05C 17/005; B65D 47/10; B65D 47/2031; B65D 47/36; B65D 51/18; F16K 15/147
See application file for complete search history.

(56) References Cited

U.S. PATENT DOCUMENTS 2,611,515 A * 9/1952 Smith .................... A47G 19/24
222/213
5,022,424 A   6/1991 Reynolds et al.
(Continued)

FOREIGN PATENT DOCUMENTS

WO   2017/132190 A1   8/2017

OTHER PUBLICATIONS

International Search Report and Written Opinion, dated Jan. 17, 2018, in International Application No. PCT/US17/57790.

*Primary Examiner* — Paul R Durand
*Assistant Examiner* — Randall A Gruby
(74) *Attorney, Agent, or Firm* — Wood, Phillips, Katz, Clark & Mortimer

(57) ABSTRACT

A valve (100, 200, 300) includes a material with a first side surface (114, 214), a second side surface (116, 216), defining between them a thickness of the material. The material includes at least two self-sealing slits (126, 130, 226, 230) extending through the thickness and includes at least one frangible portion (150, 250) extending laterally between the at least two slits (126, 130, 226, 230) for at least part of said thickness of the material. The material includes confronting, openable portions along the at least two slits (126, 130, 226, 230) to define a normally closed orifice to minimize communication through the valve (100, 200, 300). The openable portions are constrained by the at least one frangible portion (150, 250) from moving away from each other into an open condition.

4 Claims, 12 Drawing Sheets

(51) Int. Cl.
*B65D 47/20* (2006.01)
*B65D 47/36* (2006.01)
*B65D 51/18* (2006.01)
*F16K 15/14* (2006.01)

(52) U.S. Cl.
CPC .............. *B65D 47/36* (2013.01); *B65D 51/18* (2013.01); *F16K 15/147* (2013.01)

(56) References Cited

U.S. PATENT DOCUMENTS

| | | | | |
|---|---|---|---|---|
| 5,025,947 | A * | 6/1991 | Leone .................... | A47G 21/18 220/229 |
| 5,147,065 | A | 9/1992 | Rush et al. | |
| 5,377,877 | A * | 1/1995 | Brown ............... | B65D 47/2031 222/105 |
| 5,397,023 | A * | 3/1995 | Toczek .................. | B65D 47/36 215/229 |
| 5,531,363 | A * | 7/1996 | Gross ................ | B65D 47/2031 222/494 |
| 5,655,687 | A * | 8/1997 | Fitten .................. | B65D 1/0276 222/185.1 |
| 5,839,614 | A | 11/1998 | Brown | |
| 5,927,549 | A * | 7/1999 | Wood .................. | B65D 51/285 206/222 |
| 5,927,566 | A * | 7/1999 | Mueller ............. | B29C 45/1676 222/490 |
| 5,927,567 | A * | 7/1999 | Fillmore ............... | B29C 43/146 222/490 |
| 6,050,435 | A | 4/2000 | Bush et al. | |
| 6,065,642 | A * | 5/2000 | Brown .................. | B65D 33/14 222/494 |
| 6,079,594 | A * | 6/2000 | Brown ............. | B29C 45/14344 222/107 |
| 6,530,504 | B2 * | 3/2003 | Socier ................ | B65D 47/2031 222/212 |
| 6,951,295 | B1 * | 10/2005 | Gaus .................... | B05B 11/007 222/484 |
| RE39,520 | E * | 3/2007 | Hess, III ................ | B65D 5/746 222/105 |
| 8,070,014 | B2 * | 12/2011 | Wisniewski ........ | B65D 47/2031 222/494 |
| 8,628,056 | B2 * | 1/2014 | LaBean ............. | B65D 47/2031 251/149.1 |
| 8,640,928 | B2 * | 2/2014 | Ellenkamp-Van Olst .................... B65D 47/0809 137/843 |
| 8,844,767 | B1 * | 9/2014 | Bates ................. | B65D 75/5883 |
| 8,899,449 | B2 * | 12/2014 | Daansen ............ | B05B 11/007 222/212 |
| 9,598,209 | B1 * | 3/2017 | Maldonado .......... | B65D 47/106 |
| 9,701,456 | B2 * | 7/2017 | Franca ................. | B65D 31/04 |
| 10,071,837 | B2 * | 9/2018 | Franca ................. | B65D 47/2031 |
| 10,442,585 | B2 * | 10/2019 | Beilke .................... | B65D 53/04 |
| 2002/0139799 | A1 * | 10/2002 | Karaki ................... | B65D 51/14 220/229 |
| 2002/0162839 | A1 * | 11/2002 | Stull ................. | B65D 47/0804 220/229 |
| 2003/0042257 | A1 * | 3/2003 | Uchiyama ............. | B65D 47/36 220/229 |
| 2003/0213803 | A1 * | 11/2003 | Chasteen ............ | B65D 17/507 220/229 |
| 2004/0067169 | A1 * | 4/2004 | Krause .................... | B01L 3/022 422/513 |
| 2006/0228057 | A1 * | 10/2006 | Newrones ............. | B31D 1/026 383/103 |
| 2012/0187158 | A1 * | 7/2012 | Pritchard ............. | B65D 47/103 222/501 |
| 2014/0008321 | A1 | 1/2014 | Lentz et al. | |
| 2016/0023819 | A1 * | 1/2016 | Maldonado ......... | B65D 47/103 222/92 |
| 2018/0311489 | A1 * | 11/2018 | Hess, III ............... | A61M 39/24 |

* cited by examiner

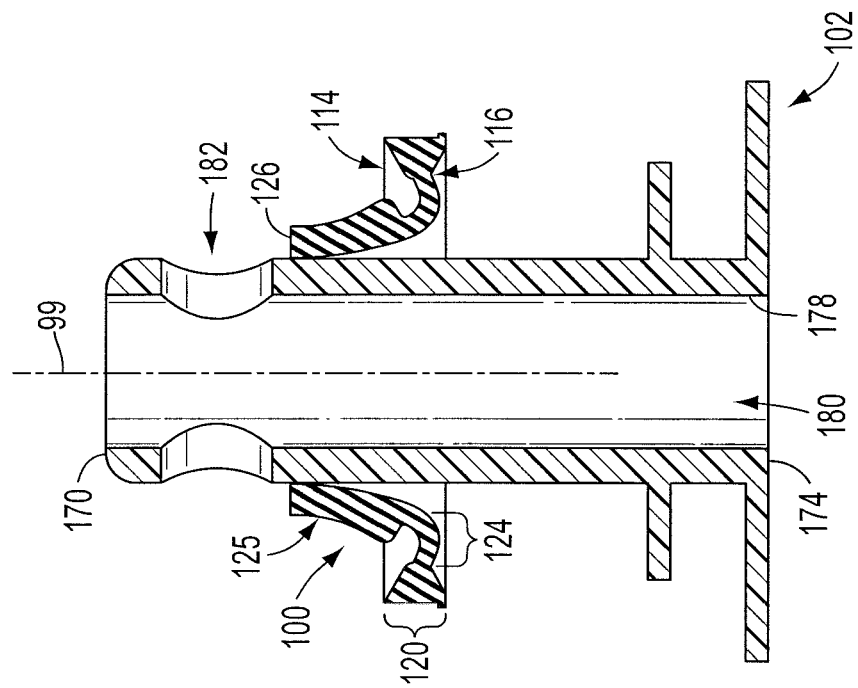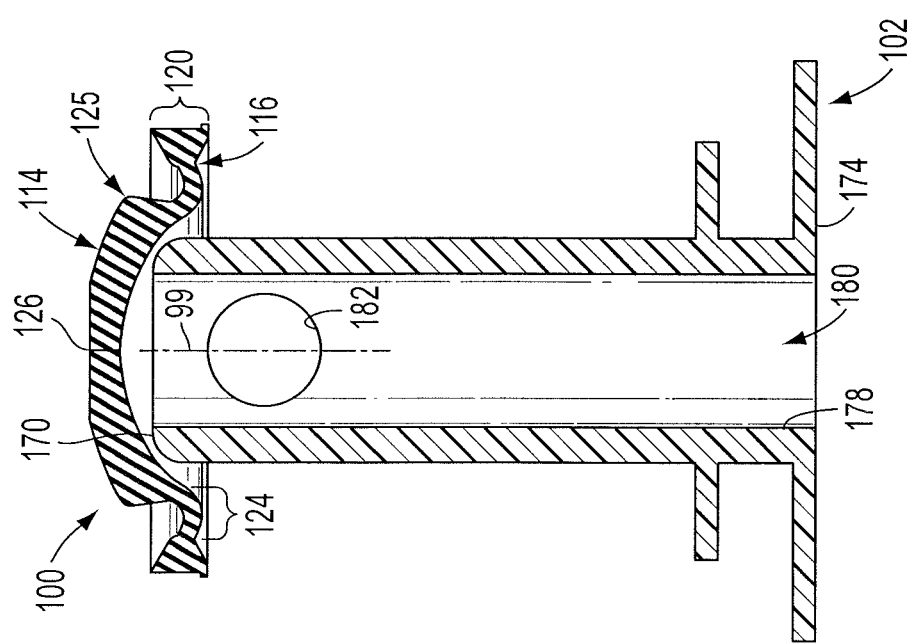

VALVE

TECHNICAL FIELD

The present invention relates generally to a valve, and more particularly a flexible valve that includes slits which can be opened.

BACKGROUND OF THE INVENTION AND TECHNICAL PROBLEMS POSED BY THE PRIOR ART

One type of valve is a flexible, resilient, self-closing, slit-type valve that can be mounted at an opening or port of a package or container of a fluent substance, or alternatively mounted within a conduit for a fluent substance. Such valves typically have a single slit or have multiple slits which define a normally closed orifice in an initially closed configuration or condition. The orifice opens to permit flow therethrough in response to either a sufficient pressure differential acting across opposite sides of the valve, or in response to mechanical engagement by a sufficiently rigid article such as a probe, cannula, conduit, or feed/drain tool inserted through the valve. Such valves that open in response to a pressure differential are typically designed so that they automatically close to seal or shut off flow therethrough in response to a sufficient reduction of the pressure differential acting across the valve. Similarly, mechanically engageable valves are typically designed so that they automatically close to seal or shut off flow therethrough upon removal of the engaging article.

A conventional valve 20 is shown in FIGS. 1-6, for use in a container of a fluent substance (not illustrated). The valve 20 is flexible, resilient, pressure-openable, self-closing, and of the slit-type. Forms of such a type of valve 20 are disclosed in the U.S. Pat. Nos. 5,839,614 and 8,678,249. The descriptions of those patents are incorporated herein by reference thereto to the extent pertinent and to the extent not inconsistent herewith.

The conventional valve 20 is suitable for use with fluent substances, such as liquids and gases, including, inter alia, beverages, lotions, and creams. The conventional valve 20 is preferably molded as a unitary structure (i.e., one-piece structure) from a single substance or material which is flexible, pliable, somewhat elastic, and resilient. This can include elastomers, such as a synthetic, thermosetting polymer, including silicone rubber, such as the silicone rubber sold by Dow Corning Corporation in the United States of America under the trade designation D.C. 99-595 and RBL-9595-40. Another suitable silicone rubber material is sold in the United States of America under the designation Wacker 3003-40 by Wacker Silicone Company.

The conventional valve 20 has an initially "closed", unactuated, substantially unstressed, rest condition or position, and can be forced to an "open" position or condition (not illustrated) when a sufficiently high pressure differential acts across the valve 20, or when the valve 20 is engaged by a probe or other sufficiently rigid article.

With reference to FIG. 5, the conventional valve 20 has a first side surface 22 and a second side surface 24. In one known application, the first side surface 22 faces an interior of a fluent substance container and the second side surface 24 faces an exterior, ambient environment.

The conventional valve 20 has a peripheral attachment portion or mounting flange 26. The peripheral portion 26 is for being mounted or attached to a container of a fluent substance. Typically, this may be achieved through a retention structure or ring (not illustrated) that can mate with a feature on the container (not illustrated) on which the valve 20 may be installed.

Still referring to FIG. 5, extending laterally inwardly from the peripheral attachment portion 26 is a generally annular, intermediate portion or sleeve 28 that connects the peripheral attachment portion 26 to a head portion 30. The head portion 30 is flexible and resilient. As can be seen in FIG. 3, the head portion 30 has a generally circular configuration in plan view. The peripheral attachment portion 26, intermediate portion 28, and head portion 30 are oriented in a generally circular configuration and concentric relationship about a central axis 31 (FIGS. 4 and 5). A fluent substance can be dispensed (i.e., discharged) through the conventional valve 20 in a discharge flow direction generally along the axis 31 when the valve 20 opens. A probe can also be used to engage and open the valve 20 (not illustrated in FIGS. 1-6).

With reference now to FIG. 3, the head portion 30 has a normally closed orifice defined by a pair of intersecting, major slits 32 radiating laterally or radially from the center of the head portion 30. The head portion 30 further has a plurality of minor slits 36 branching from the radially outward ends of each one of the major slits 32. Each of the major slits 32 and the minor slits 36 extend transversely, fully through the thickness of the head portion 30 from the first side surface 22 to the second side surface 24.

The major slits 32 define four, generally pentagonal-shaped, equally sized openable portions or major petals in the valve head portion 30. The minor slits 36 define four, generally triangular-shaped, equally sized openable portions or minor petals in the head portion 30. Each major petal has a plurality of transverse faces defined by the major slits 32, and two of such transverse faces are visible in FIGS. 5 and 6. As can be seen in FIGS. 1-6, each such transverse face seals against a confronting transverse face of an adjacent major petal when the conventional valve 20 is closed.

Likewise, each minor petal has a pair of diverging transverse faces defined by the minor slits 36, and each transverse face seals against a confronting transverse face of an adjacent minor petal when the conventional valve 20 is closed. Forms of such types of slits and petals are disclosed in the U.S. Pat. No. 8,628,056. The description of that patent is incorporated herein by reference thereto to the extent pertinent and to the extent not inconsistent herewith.

The conventional valve 20 illustrated in FIGS. 1-6 can be opened in a number of ways. For example, a probe (such as the probe 102 illustrated in FIGS. 14 and 15 for a different valve), cannula, feed/drain tool, or other rigid article can be pushed against either side of the head portion 30 and through the head portion 30 so that the openable portions deflect to accommodate penetration by the probe. The conventional valve 20 can alternatively open when it is subjected to a sufficient pressure differential (e.g., a higher pressure on the first side 22 of the head portion 30 than on the second side 24 of the head portion 30, or vice versa).

The inventors of the present invention have discovered that, at least in some applications, a conventional valve (such as the valve 20 illustrated in FIGS. 1-6) may prematurely open and/or a fluent substance may undesirably leak through the valve after the initially closed valve is installed on a container or other type of fluent substance-containing system. Various fluent substances or products (including oils, lotions, creams, gels, liquids, food items, pharmaceuticals, granules, powders, etc.) may be packaged in a rigid, flexible, or collapsible container or contained within a system. Premature, inadvertent, or unplanned ingress or egress of a fluent substance through the valve may result in contamination of a product on one side of the valve or may result in premature or unwanted loss or release of the product from the system. Such instances of ingress or egress may occur during shipping, handling, sterilization, or storage of a container on which the valve is installed (especially if, for example, the container is subjected to impact, heating (such as during pasteurization), or other pressure increasing or decreasing conditions on one side of the valve).

The inventors of the present invention have determined that for at least some applications in which some types of fluent substances are contained within a package or container, it may be desirable to provide an improved valve that can eliminate, or at least reduce or minimize, the above-described, undesirable, premature valve opening events and/or ingress or egress leakage events.

The inventors of the present invention have considered that preventing leakage through, or premature opening of, a slit valve may be effected with a valve having an initially closed slit that is fully or partially sealed or coated on at least one side of the valve so as to leave a frangible coating that must be broken to initially open the valve. While such a coated valve can work well for its intended purposes in some applications, the inventors of the present invention have discovered that such a coated valve may not be desirable in some other applications for reasons relating to cost, manufacturing complexity or difficulty, operation, etc. The inventors of the present invention have discovered that for at least some applications, it would be desirable if at least some portion of a valve can be provided with an improved structure that can initially seal, maintain, or constrain the valve operable portions in a closed position or condition until the structure is ruptured during an initial opening process of the improved valve.

The inventors of the present invention have further determined that for at least some applications in which an article such as a probe, cannula, conduit or feed/drain tool is inserted through a valve, it may be desirable to provide a valve having both (1) improved sealing properties described above, and (2) a minimally increased opening force necessary to initially open the valve, when compared to the opening force of a conventional or prior art valve.

The inventors of the present invention have also determined that it would be desirable to provide, at least for one or more types of applications, an improved valve that can be configured for use with a fluent substance container so as to have one or more of the following advantages: (1) ease of manufacture and/or assembly, (2) relatively low cost of manufacture and/or assembly, (3) reduced unit-to-unit variability of the required initial valve opening force exerted by an engaging article or pressure differential, and (4) accommodation of the manufacture of the valve by means of efficient, high-quality, large-volume techniques with a reduced product reject rate to produce valves with consistent operating characteristics.

The inventors of the present invention have discovered how to provide such a valve that includes novel, advantageous features not heretofore taught or contemplated by the prior art, and which can accommodate designs having one or more of the above-discussed benefits or features.

BRIEF SUMMARY OF THE INVENTION

The inventors of the present invention have discovered how to provide an improved valve for permitting selective communication through the valve (from one side to the other) to accommodate flow of a fluent substance therethrough. The valve may be assembled with, or provided within, a package or container of a fluent substance, or a fluid handling system (such as a fluent substance dispensing system), that has an opening between the exterior and interior of the container or system at which the valve can be installed. The valve may also be used within a fluent substance container or system that utilizes a probe, cannula, conduit (e.g., feed/drain tool), or other engaging article that is mechanically inserted through the valve.

According to one aspect of the invention, the valve includes a material that defines a first side surface and a second side surface, which between them define a thickness of the material. The material includes at least two self-sealing slits that each extend through the thickness of the material from the first side surface to the second side surface. The material further includes at least one frangible portion extending laterally between the at least two slits for at least part of the thickness of the material. The material includes confronting, openable portions along the at least two slits to define a normally closed orifice to minimize communication through the valve. The openable portions are initially constrained by the at least one frangible portion from moving away from each other into an open condition for establishing communication through the valve.

According to one aspect of the invention, the material is a composition of a single substance defining a unitary layer of substance.

According to another aspect of the invention, the material is defined by two or more layers of different substances.

According to another aspect of the invention, the material defines a flexible, head portion through which the at least two slits extend between the first and second side surfaces of the material. The material further defines an annular, peripheral attachment portion spaced laterally from the head portion. The material further defines a flexible, annular, intermediate portion extending generally laterally from the head portion to the peripheral attachment portion.

In one form of the invention, the head portion has a minimum head thickness in a central region thereof, and the at least one frangible portion defines a frangible portion thickness. The minimum head thickness of the head portion is at least four times greater than the frangible portion thickness.

According to another form of the invention, the at least one frangible portion defines a frangible portion thickness that is substantially equal to a minimum head thickness of the head portion in a central region thereof the head portion.

According to another aspect of the invention, the head portion is substantially thicker than the intermediate portion.

According to another aspect of the invention, the first side surface of the head portion is substantially convex and the second side surface of the head portion is substantially concave.

According to another aspect of the invention, the at least one frangible portion defines a frangible portion thickness that is less than about 0.5 millimeter.

In yet another aspect of the invention, the at least one frangible portion defines a frangible portion length that is between about 0.5 millimeter and 1.0 millimeter.

According to another aspect of the invention, the head portion is unitarily molded to include the at least one frangible portion.

According to yet another aspect of the invention, the at least two slits and the at least one frangible portion are defined by at least one cut in the material.

In another form of the present invention, the first side surface is substantially convex and the at least one frangible portion extends laterally along the first side surface.

According to another form of the invention, the material of the valve is silicone.

In still another form of the invention, the valve is combined with an engaging article. Movement of the article relative to the valve material, while the article is in engagement with the material, breaks the at least one frangible portion to merge the at least two self-sealing slits, permitting the openable portions to move away from each other into the open configuration.

In another form of the invention, one of the at least two self-sealing slits is a central slit, and the other of the at least two self-sealing slits is a radially extending major slit that is separated from the central slit by the at least one frangible portion.

According to yet another aspect of the invention, the major slit defines a radially outward end from which a pair of intersecting minor slits extends laterally outwardly.

In still another aspect of the invention, each one of the minor slits defines a laterally outward end that terminates at a frangible outer region. The head portion has a minimum head thickness in a central region thereof. The frangible outer region defines a frangible region thickness, and the minimum head thickness is at least four times greater than the frangible region thickness.

In another aspect of the invention, each one of the minor slits defines a minor slit length, and further defines a laterally outward end that terminates at a frangible outer region. The frangible outer region defines a frangible length, and the frangible length is at least twice as long as the minor slit length.

In yet another aspect of the invention, the first side surface is substantially convex, and each frangible outer region extends along the first side surface.

In another form of the invention, the closed orifice of the confronting, openable portions is configured to remain substantially closed when the first side surface and the second side surface are subjected to a pressure differential below about 15,000 Pascal.

In one form of the invention, the at least one frangible portion is configured to break when one of the first side surface and the second side surface is subjected to a force of less than about 70 Newtons.

According to one aspect of the invention, the valve includes a material that defines a first side surface and a second side surface, which between them define a thickness of the material. The material includes an annular, peripheral attachment portion and a flexible, annular, intermediate portion extending laterally from the peripheral attachment portion. The material further includes a flexible, head portion extending generally laterally from the flexible, annular, intermediate portion.

The head portion includes a pair of self-sealing, intersecting central slits that each extend transversely through the head portion. The head portion further includes four radially extending major slits that extend transversely through the head portion. Each one of the major slits is separated from one of the pair of self-sealing central slits by a frangible portion.

The head portion includes a pair of intersecting minor slits, each one of which (i) extends transversely through the head portion, and (ii) extends laterally outwardly from one of the major slits. Each one of the minor slits terminates at a frangible outer region having a reduced thickness.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same, FIG. 1 shows the prior art valve in an unstressed, closed condition;

FIG. 7 shows the first embodiment of the valve in an unstressed, closed condition;

FIG. 14 is an enlarged, cross-sectional view of the first embodiment of the valve of FIG. 7, together with a probe, and FIG. 14 shows the valve in the unstressed, closed condition prior to initial opening of the valve;

FIG. 15 is an enlarged, cross-sectional view similar to FIG. 14, however FIG. 15 shows the valve in an open condition whereby relative movement between the probe and the valve has forced the probe through the valve and has ruptured frangible portions of the valve material;

FIG. 16 shows the second embodiment of the valve in the unstressed, closed condition;

DESCRIPTION OF THE PREFERRED EMBODIMENTS

Figure 1:
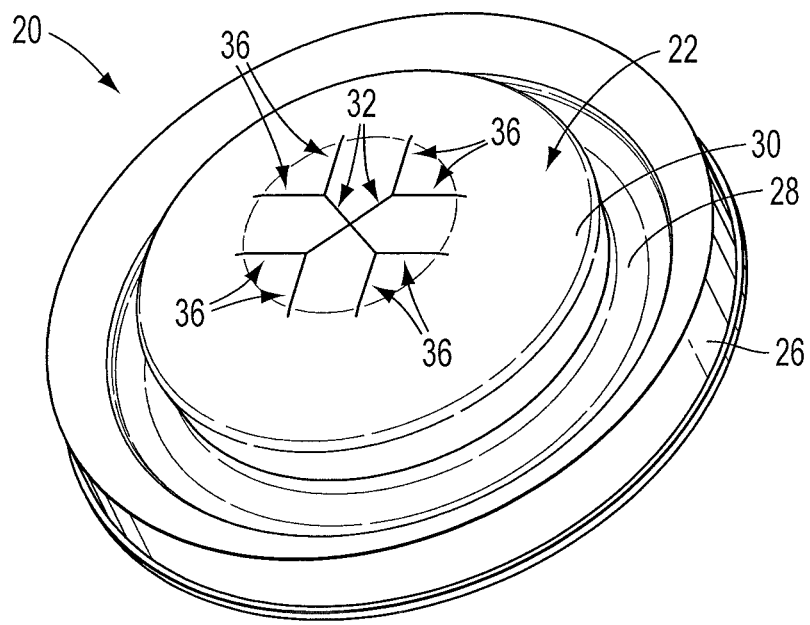
FIG. 1 is an enlarged, isometric view, taken from above, of a conventional, prior art valve.
Figure 2:
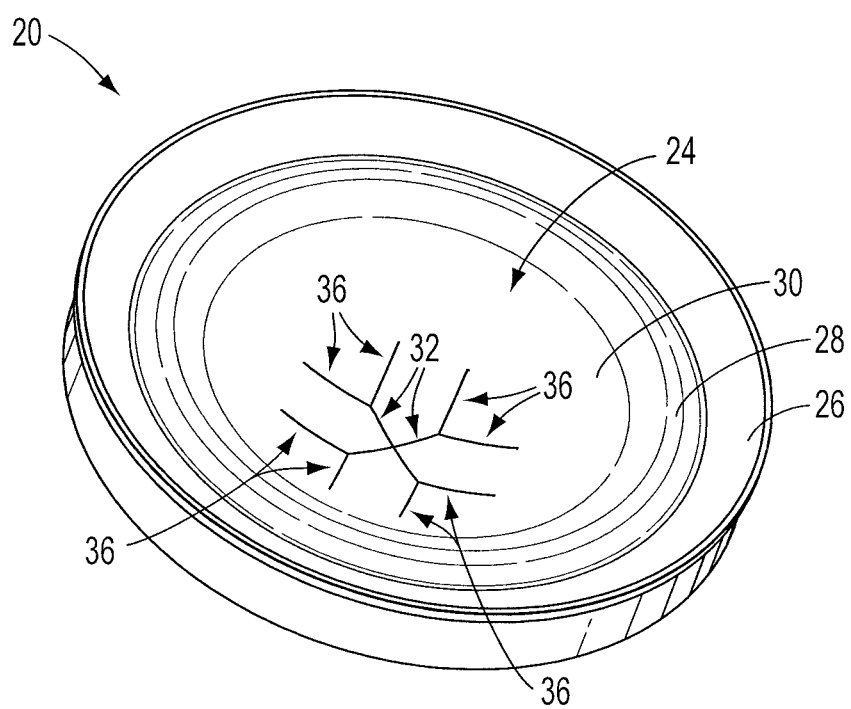
FIG. 2 is an enlarged, isometric view, taken from below, of the prior art valve of FIG. 1.
Figure 3:
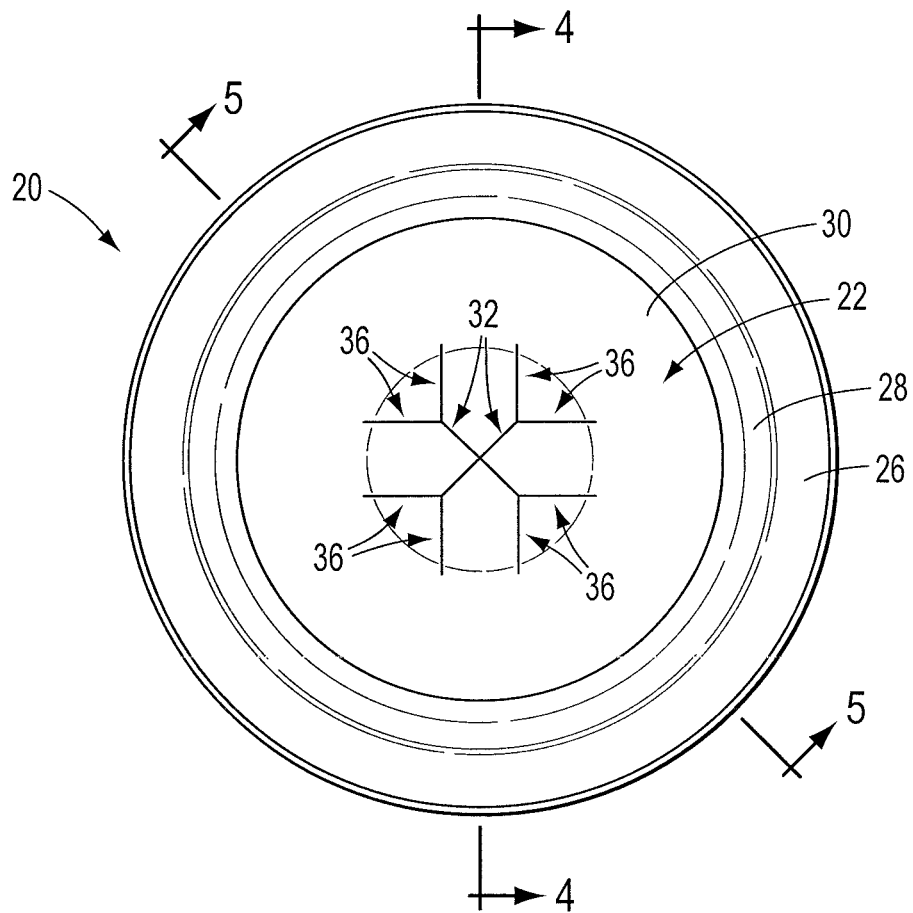
FIG. 3 is an enlarged, top plan view of the prior art valve of FIG. 1.
Figure 4:
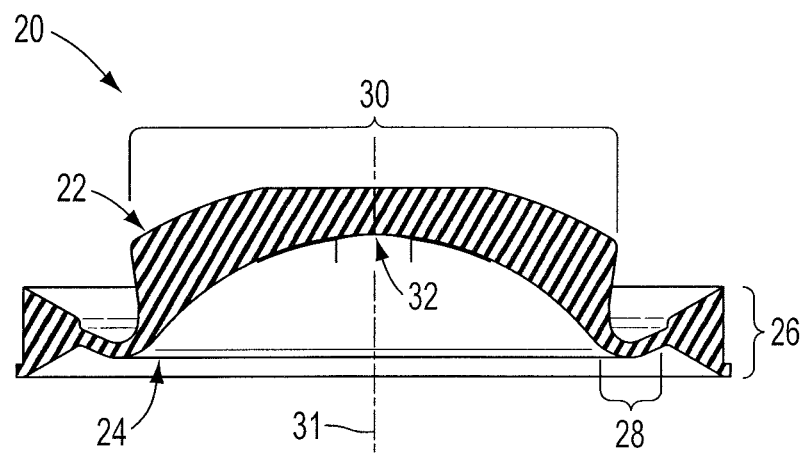
FIG. 4 is an enlarged, cross-sectional view of the prior art valve of FIG. 1, taken along plane 4-4 in FIG. 3.
Figure 5:
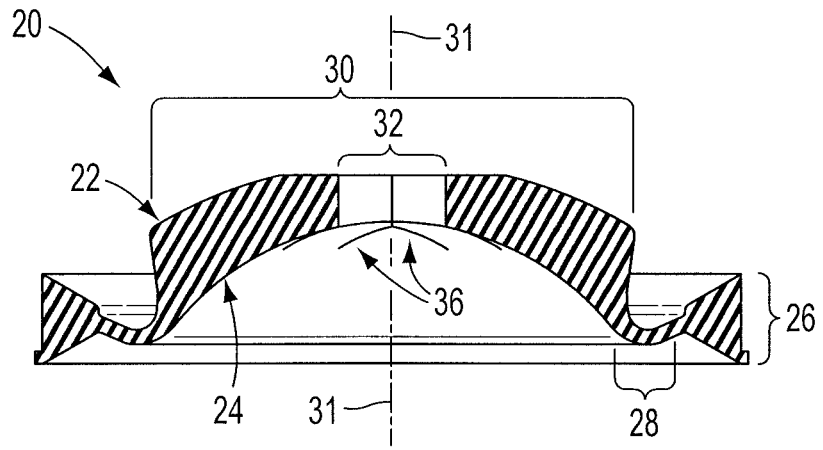
FIG. 5 is an enlarged, cross-sectional view of the prior art valve of FIG. 1, taken along plane 5-5 in FIG. 3.
Figure 6:
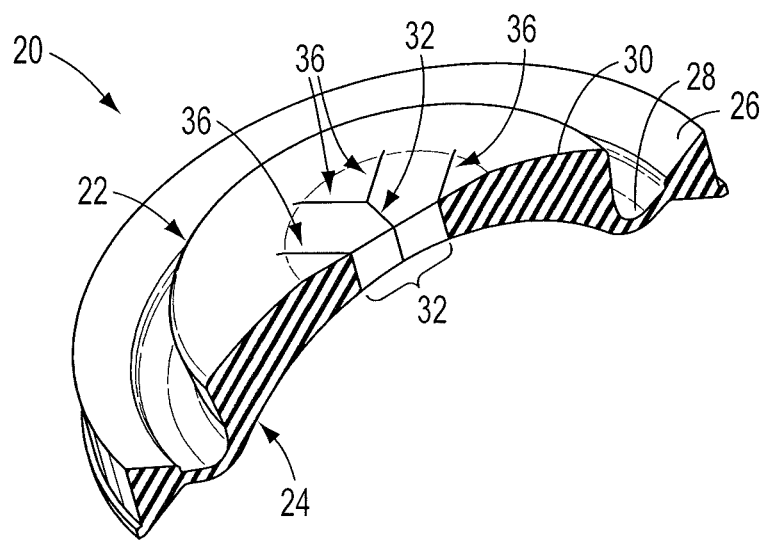
FIG. 6 is an enlarged, isometric, cross-sectional view of the prior art valve of FIG. 1, taken along plane 5-5 in FIG. 3.
Figure 7:
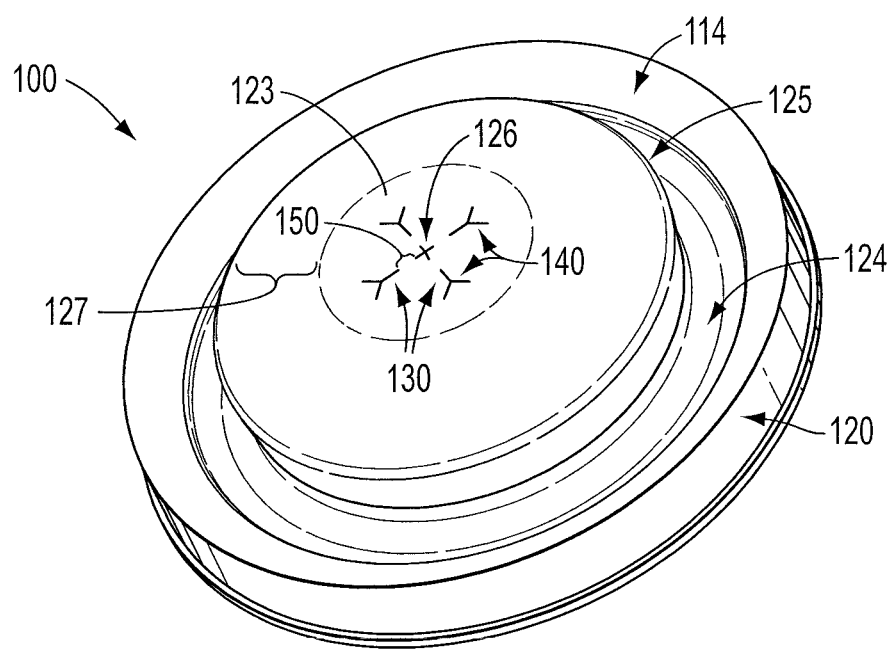
FIG. 7 is an enlarged, isometric view, taken from above, of a first embodiment of a valve according to the present invention.
Figure 8:
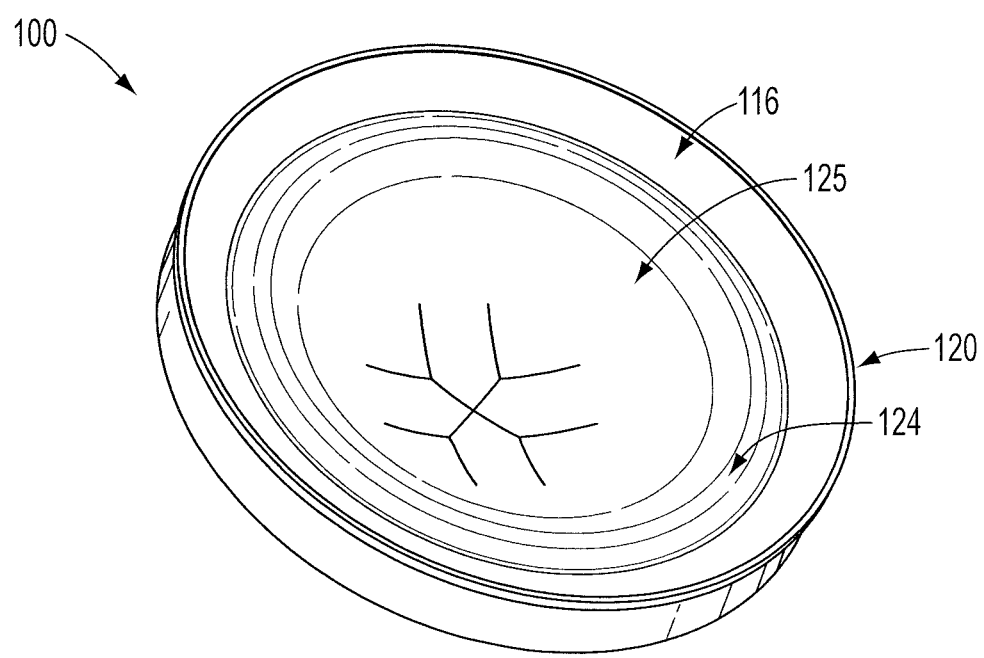
FIG. 8 is an enlarged, isometric view, taken from below, of the first embodiment of the valve of FIG. 7.

While the valve of the present invention is susceptible of embodiment in many different forms, this specification and the accompanying drawings disclose only some specific forms as examples of the invention. The invention is not intended to be limited to the embodiments so described, however.

For ease of description, the valves of this invention are described, with reference to the drawings, in a generally horizontal orientation that the valves could have when installed on a fluent substance container or system for use with a probe, wherein the probe can engage and contact the valve from below and extend through and above the valve. The terms "axial", "radial", and "lateral" are used herein with respect to an axis 99 (FIGS. 10, 11, 11A, 17, and 17A), generally defined by the center of the valve. As employed herein, the phrase "axially outwardly" refers to the direction downwardly in the figures, along the axis 99 with respect to the interior of a container (not illustrated) on which the valve could be installed. The phrase "axially inwardly" refers to the direction upwardly in the figures, along the axis 99 with respect to the interior of a container (not illustrated) on which the valve could be installed. As employed herein, the phrase "radially inwardly" refers to a direction normal to, and moving toward, the axis 99. The phrase "radially outwardly" refers to a direction normal to, and moving away from, the axis 99. The phrase "laterally outwardly" refers to a direction away from the axis 99 and also within a plane that is normal to the axis 99. It will be understood, however, that this invention may be manufactured, stored, transported, used, or sold in orientations other than the orientation shown.

The valve of this invention is suitable for use with a variety of conventional or special fluent substance containers or systems (e.g., fluent substance handling or processing systems, dispensing systems, etc.) having various designs, the details of which, although not illustrated or described, would be apparent to those having skill in the art and an understanding of such systems.

Figures illustrating one of the inventive valves which could be used in cooperation with a probe of a fluent substance container (not illustrated) show some conventional mechanical or structural features of the probe that are known to, and that will be recognized by, one skilled in the art. The detailed descriptions of such features are not necessary to an understanding of the invention, and accordingly, are herein presented only to the degree necessary to facilitate an understanding of the novel aspects of the present invention.

FIGS. 7-15 illustrate a first embodiment of a valve 100 according to the present invention. The valve 100 is used for selectively permitting communication through the valve 100 from one side of the valve to the other side (e.g., into or out of a fluent substance container or handling or dispensing system, conduit, or package), and the valve 100 typically would be in communication with an interior of such a container or system. The valve 100 is especially adapted to be installed on a container for a fluent substance dispensing system (not illustrated) employing a probe 102 (FIGS. 14 and 15) that selectively engages and extends at least partway through the valve 100 and into such a system via relative movement between the probe 102 and the valve 100.

The fluent substance container may be, for example, a flexible bag or a rigid bottle. The valve 100 could also be installed on a reservoir, a fluent substance processing system, or a fluent substance dispensing system, which contains a fluent substance at ambient atmospheric pressure or above ambient atmospheric pressure (including a system in which the pressure results from the static head of the fluent substance within the system and/or in which the system generates or otherwise creates a pressurized fluent substance therein).

The first illustrated embodiment of the valve 100 is flexible, resilient, pressure-openable, self-closing, and of the slit-type. Forms of generally related kinds of slit-type valves are disclosed in the U.S. Pat. Nos. 8,678,249 and 5,839,614. The descriptions of those patents are incorporated herein by reference thereto to the extent pertinent and to the extent not inconsistent herewith.

The valve 100 is suitable for use with fluent substances, such as liquids and gases, including, inter alia, beverages, food products, lotions, and creams. The valve 100 is preferably molded as a unitary structure (i.e., one-piece structure) from a material which is flexible, pliable, elastic, and resilient. This can include elastomers, such as a synthetic, thermosetting polymer, including silicone rubber, such as the silicone rubber sold by Dow Corning Corporation in the United States if America under the trade designation D.C. 99-595 and RBL-9595-40. Another suitable silicone rubber material is sold in the United States of America under the designation Wacker 3003-40 by Wacker Silicone Company.

The valve 100 could also be molded from other thermosetting materials or from other elastomeric materials, or from thermoplastic polymers or thermoplastic elastomers, including those based upon materials such as thermoplastic propylene, ethylene, urethane, and styrene, including their halogenated counterparts. For example, a particular non-silicone material that may be employed is ethylene propylene diene monomer rubber ("EPDM"), such as sold in the United States of America under the designation Grade Z1118 by Gold Key Processing, Inc. having an office at 14910 Madison Road, Middlefield, Ohio 44062, United States of America. Another non-silicone material that may be employed is nitrile rubber, such as sold in the United States of America under the designation Grade GK0445081-2 by Graphic Arts Rubber, having an office at 101 Ascot Parkway, Cuyahoga Falls, Ohio 44223, United States of America. It is desirable in many applications that the material be substantially inert so as to avoid reaction with, and/or adulteration of, the fluent substance in contact with the valve 100.

While the valve 100 is illustrated as being formed from a material as a single substance that defines a unitary layer of material substance, it will be appreciated that for some applications the valve 100 may be formed from a material that is defined by two or more layers of different substances. For example, one layer of the valve 100 material may be formed form a silicone rubber and one or more other layers of the valve 100 material may be formed from coatings or laminations of one or more different substances.

The valve 100 has an initially "closed", unactuated, substantially unstressed, rest position or condition (as best seen in FIGS. 7-14). The valve 100 can be forced to an "open" position or condition (as shown in FIG. 15) when the valve 100 is engaged by a sufficiently rigid article coming into contact with the valve 100 material. Alternatively, the valve 100 can be forced to an "open" position or condition when a sufficiently high pressure differential acts across the opposite sides of the valve 100.

Figure 10:
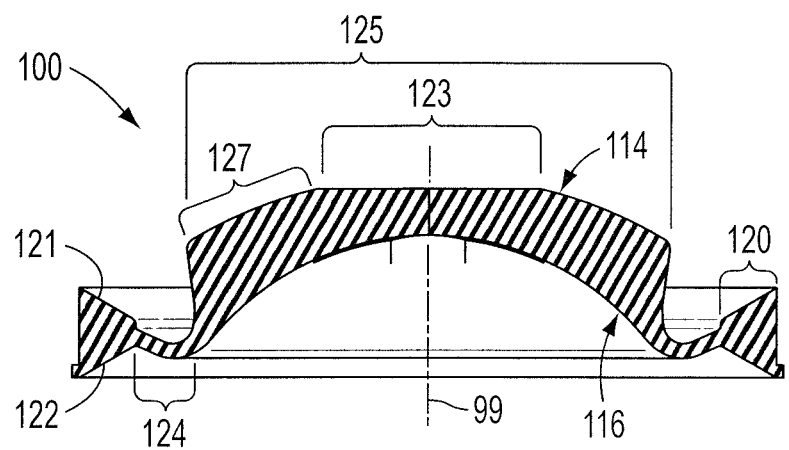
FIG. 10 is an enlarged, cross-sectional view of the first embodiment of the valve of FIG. 7, taken along plane 10-10 in FIG. 9.
Figure 11:
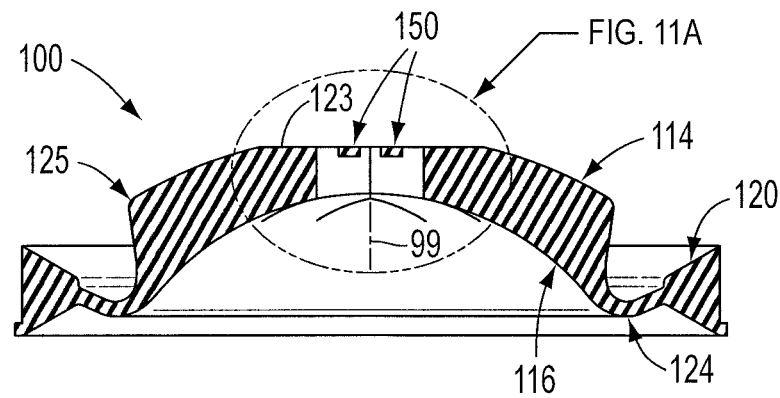
FIG. 11 is an enlarged, cross-sectional view of the first embodiment of the valve of FIG. 7, taken along plane 11-11 in FIG. 9.

With reference to FIGS. 10 and 11, the valve 100 material has a first side surface 114 and a second side surface 116. In some applications, the first side surface 114 may face an interior of a fluent substance container and the second side surface 116 may face an exterior, ambient environment. However, in other applications, the second side surface 116 may face an interior of a fluent substance container and the first side surface 114 may face an exterior, ambient environment. In still other applications, the valve 100 may be contained wholly within a conduit or system for processing, dispensing, or handling a fluent substance.

Still referring to FIG. 10, the valve 100 has a peripheral attachment portion or mounting flange 120. The peripheral portion 120 may have any suitable configuration for being mounted to, attached to, connected with, or for otherwise accommodating, installation on or in a container or system. Typically, this may be achieved through a retention structure or ring (not illustrated) that can mate with a feature on the container (not illustrated) in which the valve 100 may be installed.

The particular configuration of the peripheral attachment portion 120 illustrated in FIG. 10 may be characterized generally as a modified dove-tail configuration when viewed in vertical cross section through central axis 99. The peripheral attachment portion 120 includes a first frustoconical surface 121 and second frustoconical surface 122 for being clamped between mating features of a container or system (not illustrated) for retaining or holding the valve 100 in place. Preferably, the peripheral attachment portion 120 is somewhat resiliently compressed so as to accommodate the creation of a secure, leak-resistant seal when the peripheral attachment portion 120 is compressively engaged within the container or system.

With appropriate modification of the container or system, other shapes could be used for the peripheral attachment portion 120. Some other shapes of flange cross sections which could be employed on the valve 100 are illustrated in the U.S. Pat. No. 5,409,144. In some applications, it may be desirable to configure the peripheral attachment portion 120 for attachment to the container or system by means of adhesive, heat bonding, or other suitable means.

As shown in FIG. 10, extending generally radially inwardly toward the central axis 99, and away from the peripheral attachment portion 120, is a generally annular, intermediate portion or sleeve 124 that connects the peripheral attachment portion 120 to a head portion 125. The head portion 125 is flexible and resilient. When the valve 100 is in the closed position or condition as shown in FIGS. 7-14, the intermediate portion 124 has a tubular configuration to locate the head portion 125 so that a part of the head portion 125 projects axially inwardly (e.g., toward the interior of the container or system) beyond the peripheral attachment portion 120.

The intermediate portion 124 of the valve 100 is preferably configured for use in conjunction with a particular fluent substance supply system or container, and a specific type of fluent substance, so as to achieve the flow characteristics desired. For example, the viscosity and density of the fluent substance are factors to be considered. The rigidity and durometer of the valve material, and size and thickness of portions of both the head portion 125 and the intermediate portion 124, are additional factors to be considered.

Figure 9:
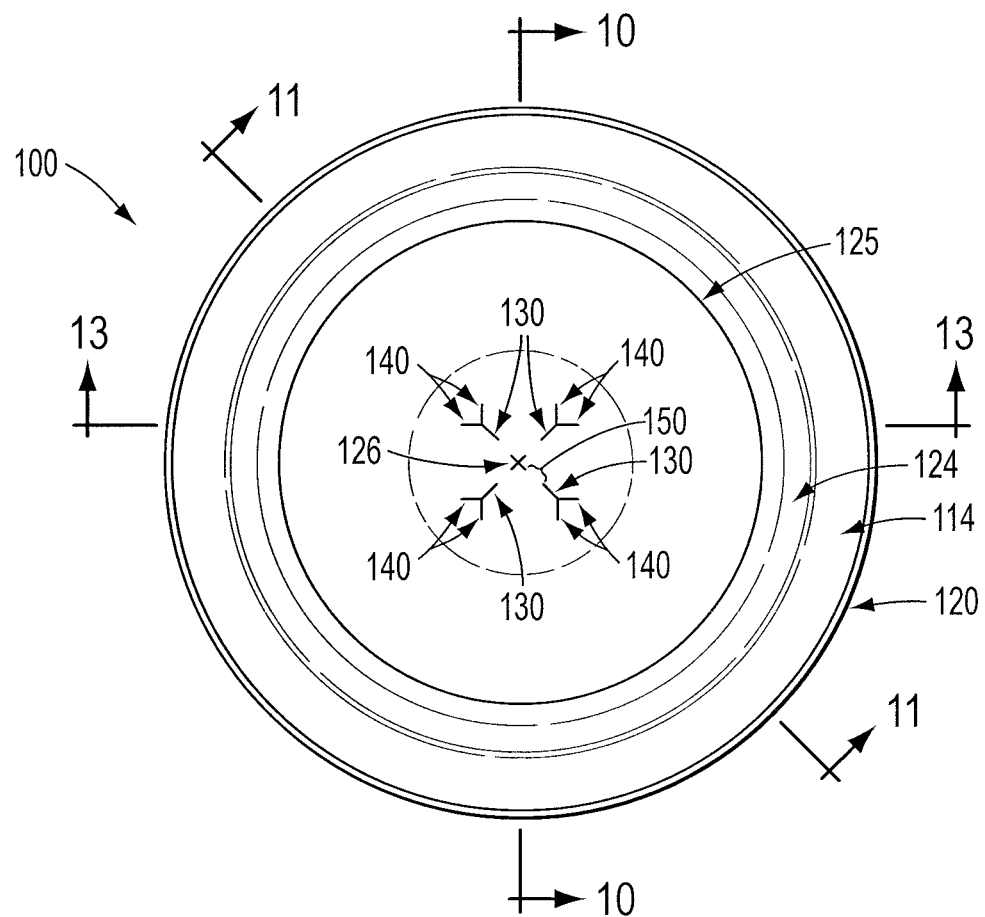
FIG. 9 is an enlarged, top plan view of the first embodiment of the valve of FIG. 7.

As can be seen in FIG. 9, the head portion 125 of the valve 100 has a generally circular configuration in plan view. The peripheral attachment portion 120, the intermediate portion 124, and the head portion 125 are oriented in a generally circular configuration and concentric relationship relative to the central axis 99 (visible in FIG. 10). A fluid substance can be dispensed (i.e., discharged) through the valve 100 in a discharge flow direction generally along the axis 99 when the valve 100 opens, as will be discussed in detail hereinafter. An engagement article, such as the probe 102 illustrated in FIGS. 14 and 15, can also be used to engage and open the valve 100 and to facilitate communication of a fluid substance through the valve 100.

Referring now to FIG. 10, the valve 100 is flexible and changes configuration between (1) a closed, rest position or condition (as shown closed in FIGS. 7-14), and (2) an open position or condition (FIG. 15). The first side surface 114 of the valve 100 has a generally convex configuration when the valve 100 is in the closed condition and viewed in FIG. 10 along a vertical cross sectional plane through axis 99. The first side surface 114 of the head portion 125 has a planar and circular central region 123 (FIGS. 7 and 10) extending laterally outwardly around the axis 99 when the valve 100 is in the closed condition. In addition, an annular, laterally outward region 127 (FIGS. 7 and 10) of the head portion 125, on the first side surface 114, lies on a partially spherical locus that also defines a circular arc in longitudinal cross section as viewed along a plane containing the axis 99.

With reference to FIG. 10, the second side surface 116 has a partially spherical and concave configuration, when the valve 100 is in the closed condition and viewed in FIG. 10 along a vertical cross sectional plane containing the axis 99. The radius of the circular arc of the head portion 125 on the second side surface 116 is smaller (less) than the radius of the circular arc of the annular region 127 of the head portion 125 on the first side surface 114.

When the head portion 125 is viewed in cross section, as illustrated in FIG. 10, the head portion 125 is substantially thicker than the intermediate portion 124 of the valve 100. In addition, the head portion 125 is thicker at a radially outer portion thereof, and is thinner at a radially inside portion thereof. This configuration assists in providing a desirable opening action and closing action of the valve 100.

While the first illustrated embodiment of the valve 100 has a distinct head portion 125, intermediate connecting portion 124, and peripheral attachment portion 120, it will be understood that in one broad aspect of the present invention the valve 100 need not be limited to such a structure. For example, in one application the valve 100 could be formed from a planar diaphragm or sheet of material that is clamped or retained within a container or system. For some applications, the peripheral attachment portion 120, if provided, could be a rigid member (e.g., a thermoplastic ring or retainer) attached to the rest of the valve 100. In addition, the intermediate connecting portion 124, if provided, could merely be a flexible portion of the valve 100, and may not necessarily be resilient in some applications. In yet another application, the valve 100 could be a duck-bill type valve.

With reference to FIG. 9, the head portion 125 has a pair self-sealing, intersecting central slits 126 that each extend transversely and fully through the head portion 125. The central slits 126 radiate generally from the center of the head portion 125. The head portion 125 further has four radially extending major slits 130 that each extend transversely and fully through the head portion 125. Each one of the major slits 130 is spaced or separated radially from one of the central slits 126. Each of the four major slits 130 includes a pair of minor slits 140 that branch laterally outwardly from the radially outward end or termination point of the major slit 130. Each of the minor slits 140 extends fully and transversely through the valve head portion 125. The valve head portion 125 has a total of eight minor slits 140. The arrangement of the slits 126, 130, 140 within the head portion 125 form a modified snowflake pattern.

Still referring to FIG. 9, the two central slits 126, four major slits 130, and eight minor slits 140 define openable flaps, segments, portions or petals in the valve head portion 125 to define a normally closed orifice. Each petal has a plurality of transverse faces defined by the slits 126, 130, 140, and each transverse face seals against a confronting transverse face of an adjacent petal when the valve orifice is closed. Variations and forms of such openable portions are disclosed in U.S. Pat. No. 8,628,056. The description of that patent is incorporated herein by reference thereto to the extent pertinent and to the extent not inconsistent herewith.

As best shown in FIG. 9, the head portion 125 of the valve 100 has four thinned regions, perforations, connecting webs or frangible portions 150, each one of which extends between one of the central slits 126 and one of the major slits 130. The openable portions of the valve 100 may be said to be constrained or inhibited from moving away from each other into an open condition (for establishing communication through the valve 100) by the frangible portions 150. The term "constrained" as used in respect to the openable portions means that the they are substantially prevented by the frangible portions 150 from permitting any flow, or at least any flow greater than a predetermined leakage amount, when the valve 100 is subjected to an opening force or opening pressure differential that does not exceed a predetermined design value. The frangible portions 150 may further be said to improve the overall tightness of the valve 100, compared to a conventional slit-type valve (like the valve 20).

As will be discussed in greater detail hereinafter, the frangible portions 150 are designed and arranged to break, rupture, or tear in a manner that connects each one the four major slits 130 with the nearest central slit 126 to allow the valve orifice openable portions (i.e., petals) to move into an open position or condition when the valve 100 is subjected to either of a predetermined force or pressure.

Figure 11A:
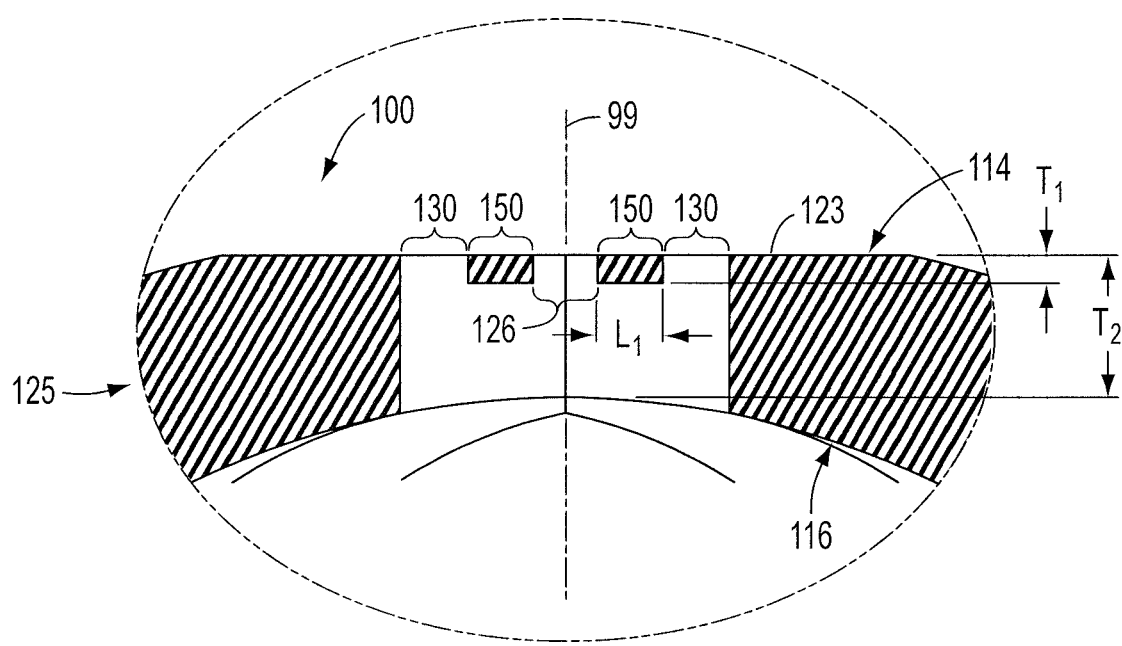
FIG. 11A is a greatly enlarged, fragmentary, cross-sectional view of the portion of the first embodiment of the valve of FIG. 7, that is enclosed in the circle designated as "FIG. 11A" in FIG. 11.

With reference now to FIG. 11A, each frangible portion 150 has a length $L_1$ in the radial direction between one of the central slits 126 and one of the major slits 130. The length $L_1$ of each frangible portion 150 is preferably between about 0.5 millimeter and 1.0 millimeter. In the first illustrated embodiment of the valve 100, the length $L_1$ of each frangible portion 150 is about 0.76 millimeter.

Still referring to FIG. 11A, each frangible portion 150 further defines a thickness $T_1$, in a direction generally parallel to the central axis 99. The thickness $T_1$ of each frangible portion 150 is less than about 0.5 millimeter, and is preferably less than about 25% of the minimum thickness $T_2$ of the center of the valve head 125, measured generally along the central axis 99. In one presently preferred application, the thickness $T_1$ of each frangible portion 150 is about 0.33 millimeter, which is less than about 20% of the minimum thickness $T_2$ of the center of the valve head 125 along the central axis 99.

Figure 13:
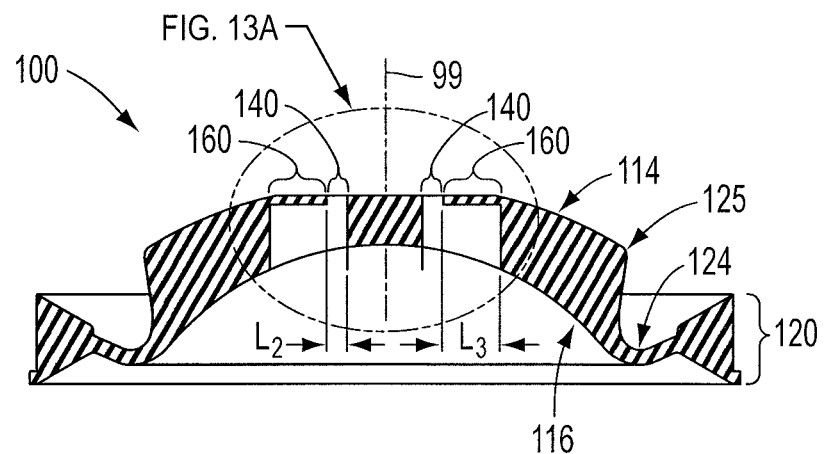
FIG. 13 is an enlarged, cross-sectional view of the first embodiment of the valve of FIG. 7, taken along plane 13-13 in FIG. 9.

With reference now to FIG. 13, each of the minor slits 140 has a laterally outward end (the end furthest away from the central axis 99) that terminates at a frangible outer region 160 having a reduced thickness compared to the adjacent areas of the valve head portion 125. Each minor slit 140 has a length $L_2$ that is preferably between about 0.5 millimeter and 1.0 millimeter. In one presently preferred application, the length $L_2$ of each minor slit 140 is about 0.76 millimeter. Each frangible outer region 160 has a length $L_3$ preferably between about 0.5 millimeter and 3.0 millimeter. In one presently preferred application, the length $L_3$ of each frangible outer region 160 is about 2.0 millimeters.

Figure 13A:
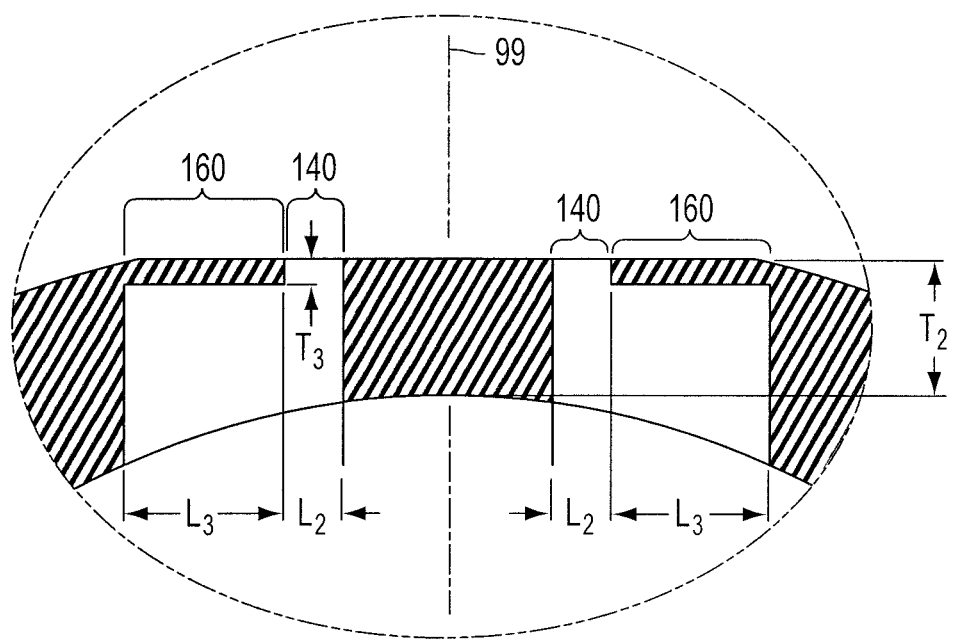
FIG. 13A is a greatly enlarged, fragmentary, cross-sectional view of the portion of the first embodiment of the valve of FIG. 7, that is enclosed in the circle designated as "FIG. 13A" in FIG. 13.

Referring now to FIG. 13A, each frangible outer region 160 further defines a thickness $T_3$ in a direction generally parallel to the central axis 99. The thickness $T_3$ of each frangible outer region 160 is preferably less than about 0.5 millimeter and, in one presently preferred application, the thickness $T_3$ of each frangible outer region 160 is about 0.33 millimeter. Preferably, the minimum head thickness $T_2$ of the valve head portion 125 is at least four times greater than the frangible region thickness $T_3$.

In the first illustrated embodiment of the valve 100, the valve 100 is injection molded, and the slits 126, 130, 140 are subsequently cut or stamped into the head portion 125 by suitable special or conventional techniques. The frangible portions 150 and the frangible outer regions 160 are formed by cutting only partially into the thickness of the valve head portion 125. Alternatively, the valve 100 can be molded to define the slits 126, 130, 140, frangible portions 150, and the frangible outer regions 160. In the first illustrated embodiment, both the frangible portions 150 and the frangible outer regions 160 extend along the first side surface 114 of the valve 100. It will be appreciated however, that in other applications the frangible portions 150 and/or the frangible outer regions 160 may be provided on, and extend along, either or both of the side surfaces 114 and 116. In yet other applications, the frangible portions 150 and/or the frangible outer regions 160 may extend between openable portions of the valve 100 in the middle or interior part of the valve head 125—at a location or locations that are spaced from both of the side surfaces 114 and 116.

The valve 100 can be opened in a number of ways. For example, the probe 102 (FIGS. 14 and 15) can be pushed against either side of the head portion 125 and through the head portion 125 as the openable portions deflect to accommodate penetration by the probe 102. The valve 100 can also be opened when it is subjected to a sufficient pressure differential (i.e., a lower pressure on one side 114, 116 of the head portion 125 than on the other side 114, 116 of the head portion 125).

The inventors have found that providing one or more frangible portions 150, extending between separated slits in the valve 100, can improve the transportability and/or storage characteristics of a container or other system in which the valve 100 is installed. In particular, the improved valve 100 may eliminate, or at least reduce or minimize, undesirable, premature valve opening events or other ingress or egress leakage events during transportation, storage, heating, or over-pressurization of the fluent substance container or system in which the valve 100 is installed.

In the first illustrated embodiment of the valve 100, the valve 100 is designed to remain substantially closed when the first side surface 114 and the second side surface 116 are subjected to a pressure differential below about 15,000 Pascal.

It may be desirable to modify the valve 100 to remain closed at even greater pressure differentials in some applications, such as when (i) the valve is installed in a package in a different orientation than the one that is illustrated, (ii) the package in which the valve is installed is subjected to a longer or a higher temperature pasteurization process, or (iii) the package in which the valve is installed is likely to experience greater shocks and impacts during shipping, etc.

In still other applications, such as when the probe 102 that is used to initially open the valve has a limited available driving force, or when the valve 100 is designed to be opened by only a small pressure differential (such as may be the case when a package is designed for a user with arthritis), etc., it may be desirable to modify the valve 100 so that it opens when subjected to a significantly lower pressure differential.

The inventors have further found that providing one or more frangible outer regions 160, extending from the outer ends of the minor slits 140 in the valve 100, can further improve the transportability and/or storage characteristics of a container or other system in which the valve 100 is installed. In particular, the improved valve 100 with a frangible outer region 160 may constrain the openable portions of the valve to eliminate, or at least reduce or minimize, potential undesirable, premature valve opening events or other ingress or egress leakage events during transportation, storage, heating, over-pressurization of the fluent substance container or system in which the valve 100 is installed.

The inventors have further found that a valve 100 disclosed herein with frangible portions 150 and/or frangible outer regions 160 may be more cheaply or easily manufactured when compared to other types of valves, such as a valve having a coating applied across the slits on one or both side surfaces. The inventors have discovered that there may be a significant advantage in using a vibratory device (e.g., ultrasonic blade or press) to cut or otherwise form slits initially extending only partway through portions of the valve material. It is believed that such a vibratory device may allow the resilient valve material to rebound during the cutting process to more precisely or accurately form a frangible portion 150 and/or frangible outer region 160 within the desirable ranges described above. Such a technique may have the following advantages: (1) more easily providing a valve with an acceptable variability in the depth of the partial, non-through slits in the valve material; and/or (2) providing a valve with an acceptable initial force requirement for initially opening the valve to break the remaining uncut or frangible material of the valve (in some applications it may be desirable for the valve 100 to open at a relatively low initial force, while in yet other applications it may be desirable for the valve 100 to open at a relatively high initial force).

With reference to FIGS. 14 and 15, the valve 100 is shown with an associated hollow probe 102. The valve 100 is shown arranged on one side of the probe 102, wherein the structures of the fluent substance container that would retain or clamp the peripheral mounting portion 120 of the valve 100 are not illustrated. In FIG. 14, the frangible portions 150 and the frangible outer regions 160 (which are rotated out of the plane of view) are intact, prior to being ruptured during initial movement of the valve 100 into the open position or condition. The probe 102 has a distal end 170 for abutting and contacting the valve 100, and has a proximal end 174 from which the fluent substance can be dispensed out of the container after the probe 102 is forced through the valve 100 to communicate with the fluent substance in the container. The probe 102 is hollow and has an interior surface 178 defining a through passage 180 for accommodating the flow of the fluent substance through the probe 102. The probe 102 has a port or aperture 182 located near the distal end 170 for directing the fluent substance into the through passage 180 after the valve 100 has been initially opened.

Although the frangible portions 150 and the frangible outer regions 160 are visible in FIGS. 9 and 13, respectively, they are not visible in FIG. 15, which has a different plane of view. It will be understood that the frangible portions 150 and the frangible outer regions 160 have been ruptured in FIG. 15 upon initial opening of the valve 100 as next discussed. The distal end 170 of the probe 102 initially contacts the second side surface 116 of the valve 100. The probe 102 is pushed in an axially inward direction against the head portion 125 of the valve 100 such that the head portion 125 distends axially inwardly (which is upwardly in FIG. 15). Movement of the head portion 125 ruptures the frangible portions 150 at a predetermined force to connect the central slits 126 with the major slits 130 (not visible in FIG. 15). It will be understood that the rupturing or tearing of the frangible portions 150 may not occur perfectly in a radial direction between the radially outer ends of each central slit 126 and the closest major slit 130, and some remnants of the frangible portions 150 may be distributed evenly or unevenly on one or both transverse faces of the openable portions. The remnants of the frangible portions 150 might have a jagged, zig-zag appearance as a tear propagates between the ends of each central slit 126 and the closest major slit 130.

Figure 12:
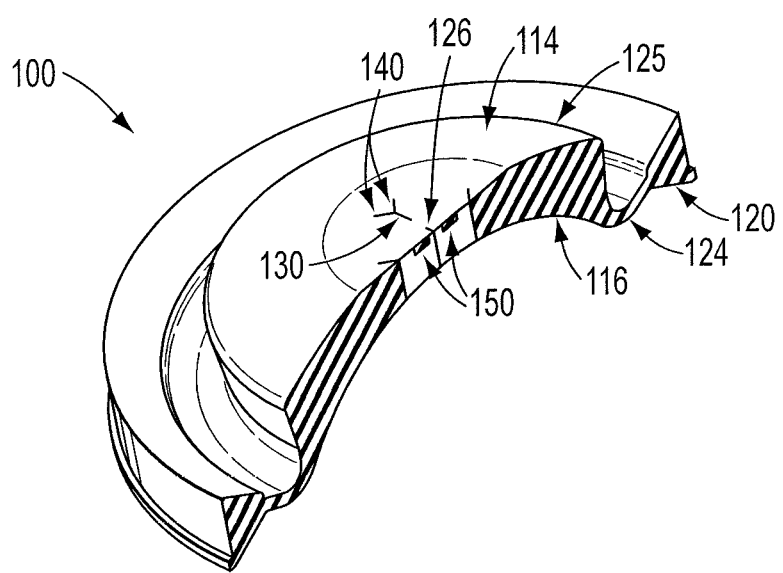
FIG. 12 is an enlarged, isometric, cross-sectional view of the first embodiment of the valve of FIG. 7, taken along plane 11-11 in FIG. 9.

Subsequent to the rupture of the frangible portions 150, the valve head portion 125 continues to distend axially inwardly such that the openable portions open to create at least a partially open orifice. The rupture or tearing of the frangible outer regions 160 (FIG. 13) begins at the laterally outward ends of each minor slit 140 (FIGS. 12 and 13). However, it will be understood that the outer regions 160 may be designed to tear simultaneously with, before, or after, the initial movement of the probe 102 through the valve head portion 125. With both the frangible portions 150 and the frangible outer regions 160 ruptured, the openable portions of the valve 100 are free to move further away from each other to permit movement of a full width of the probe 102 through the fully-open orifice in the valve 100.

As shown in FIG. 15, the probe 102 has moved far enough through the open valve 100 such that the port 182 is located axially inwardly of the valve 100, whereby a fluent substance may travel into the distal end 170 and/or the port 182, down through the passage 180, and out of the probe proximal end 174 (or, in an alternate process, a fluent substance may flow into the probe proximal end 174 and out through the probe distal end 170).

The inventors have discovered that it may be advantageous to provide a valve 100 with improved sealing properties and having a force requirement, to initially open the valve 100 and rupture the frangible portions 150 and frangible outer regions 160, that is not significantly increased when compared to a conventional valve, such as the conventional valve 20. For example, if the hollow probe 102 has a diameter of about 12.7 millimeters and contacts the second side 24 of the conventional valve 20, the average opening force might be about 35 Newtons. The valve 100, having improved sealing properties, has been found to open from contact with the same hollow probe 102 at a force that is no greater than about 70 Newtons, and more preferably no greater than about 37 Newtons.

It will be understood that while FIG. 15 shows the valve 100 opening in response to the mechanical force of an appropriately-sized probe 102, a probe 102 may not be required for some applications. For example, the valve 100 may be installed or arranged on the opening of a fluent substance container, and the head portion 125 may be subjected to a sufficient pressure differential to rupture the frangible portions 150 and the frangible outer regions 160 and to open the valve 100 to permit flow of the fluent substance therethrough.

Figure 16:
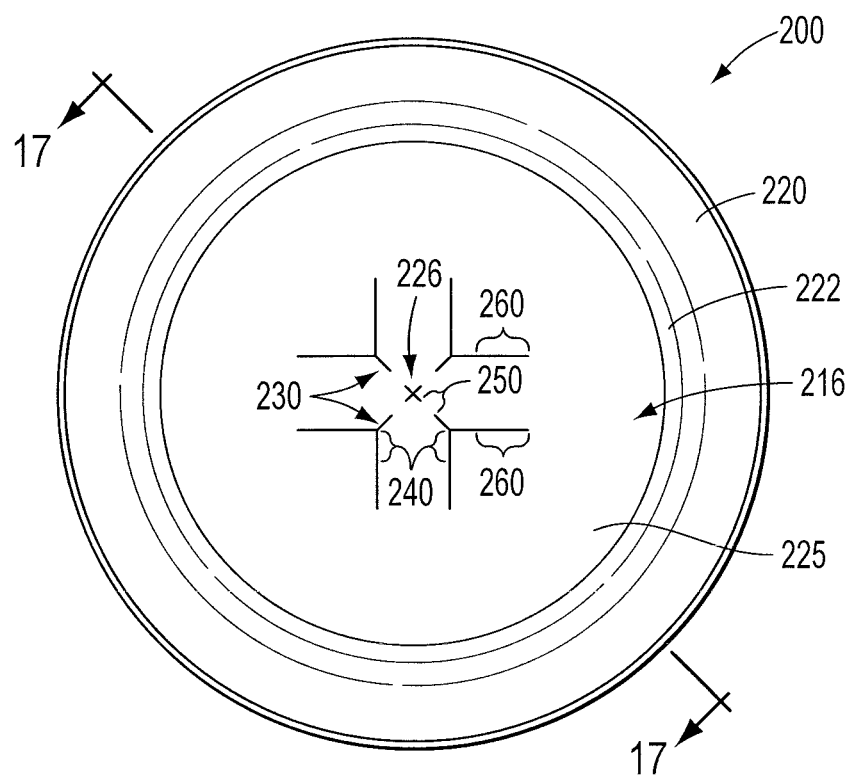
FIG. 16 is an enlarged, bottom plan view of a second embodiment of a valve according to the present invention.
Figure 17:
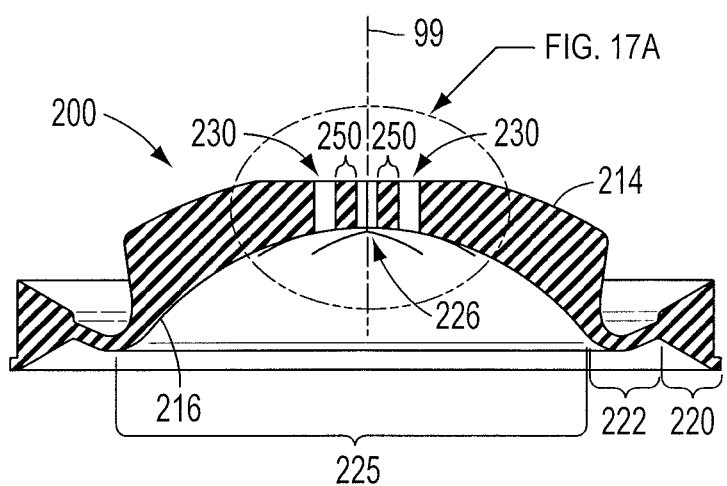
FIG. 17 is an enlarged, cross-sectional view of the second embodiment of the valve of FIG. 16, taken along plane 17-17 in FIG. 16.
Figure 18:
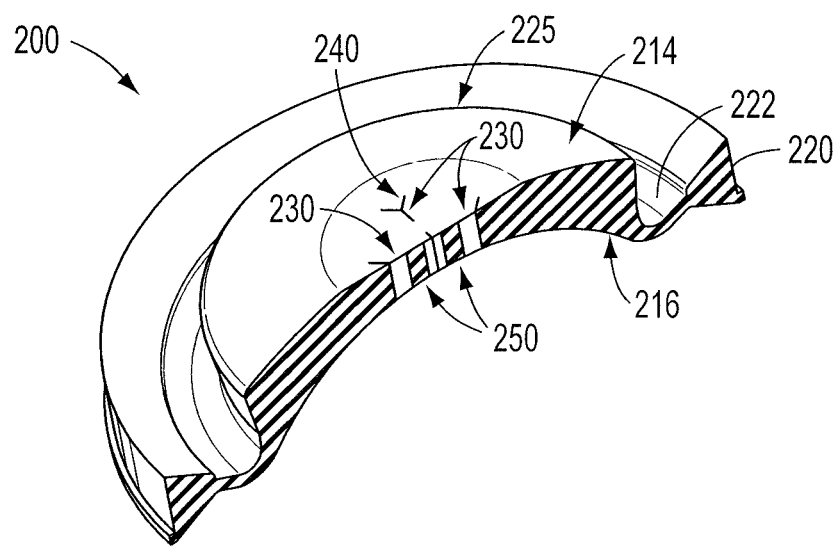
FIG. 18 is an enlarged, isometric, cross-sectional view of the second embodiment of the valve of FIG. 16, taken along plane 17-17 in FIG. 16.

A second embodiment of a valve 200 according to the present invention is illustrated in FIGS. 16-18. The second illustrated embodiment of the valve 200 can be formed from the same material substance, or substances, that are discussed in detail above with respect to the first illustrated embodiment of the valve 100. As will be discussed in detail below, the second illustrated embodiment of the valve 200 functions generally in the same manner as the first illustrated embodiment of the valve 100, in that there are portions of the valve 200 that are designed to initially constrain the opening of valve 100 below a predetermined force or pressure differential acting on or across the valve 200, but which are designed to rupture when the valve 200 is subjected to a predetermined force or pressure differential.

As can be seen in FIG. 17, the second illustrated embodiment of the valve 200 has a first side surface 214, a second side surface 216, and a peripheral attachment portion 220 for being mounted to a container or system. A generally annular, intermediate portion 222 extends generally radially inwardly toward a central axis 99 and away from the peripheral attachment portion 220. The intermediate portion 222 connects the peripheral attachment portion 220 to a head portion 225.

With reference to FIG. 16, the head portion 225 has a normally closed orifice defined by a pair self-sealing, intersecting central slits 226 extending fully through the head portion. The central slits 226 radiate laterally or radially from the center of the head portion 225. The head portion 225 further has four radially extending major slits 230, each one of which is spaced or separated from one of the central slits 226, The major slits 230 also extend fully through the valve head portion 225. Each of the four major slits 230 has a pair of minor slits 240 branching laterally outwardly therefrom. Each of the minor slits 240 extends fully through the valve head portion 225. The valve head portion 225 has a total of eight minor slits 240. The slits 226, 230, 240 within the valve head portion 225 also form a modified snowflake pattern.

Figure 17A:
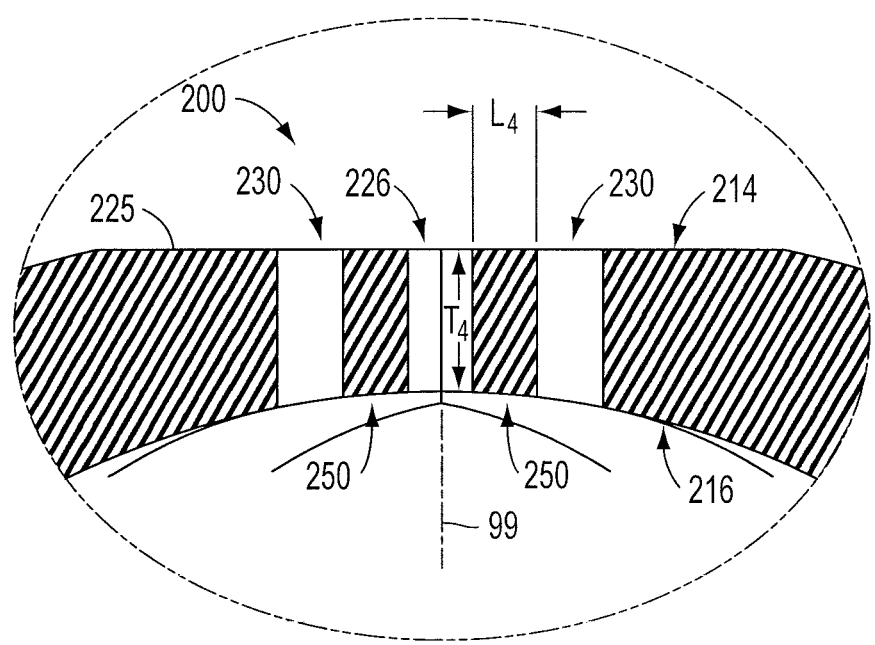
FIG. 17A is a greatly enlarged, fragmentary, cross-sectional view of the portion of the second embodiment of the valve of FIG. 16 that is enclosed in the circle designated as "FIG. 17A" in FIG. 17.

As best shown in FIGS. 17 and 17A, the head portion 225 of the valve 100 has a frangible portion 250 extending radially between one of the two central slits 226 and the nearest one of the four major slits 230. As will be discussed in greater detail hereinafter, the frangible portions 250 constrain the valve 200 to minimize or prevent ingress or egress of a fluent substance through the valve 200 below a predetermined force or pressure differential acting on or across the valve 200. The frangible portions 250 are designed and arranged to break, rupture, tear in a manner that connects each of the radially outward ends of the central slits 226 with one of the four major slits 230 to allow the valve 200 to move into an open position when the valve 200 is subjected to a predetermined force or pressure.

As best shown in FIG. 17A, the frangible portions 250 of the second illustrated embodiment of the valve 200 differ in the configuration from the frangible portions 150 of the first illustrated embodiment of the valve 100. Whereas the frangible portions 150 of the first illustrated embodiment of the valve 100 have a significantly reduced thickness when compared to adjacent portions of the valve head 125, the frangible portions 250 of the second illustrated embodiment of the valve 200 have a thickness that is substantially the same when compared to adjacent portions of the valve head 225.

Still referring to FIG. 17A, each frangible portion 250 of the valve 200 defines a minimum thickness $T_4$ between the first and second sides 214, 216, in a direction generally parallel to the central axis 99. The minimum thickness $T_4$ of each frangible portion 250 is about equal to the minimum thickness of the valve head portion 225 at the center of the valve head portion 225. In one presently preferred configuration, the thickness $T_4$ of the frangible portion 250 is about 1.7 millimeters.

Each frangible portion 250 has a length $L_4$ in the radial direction between one of the two central slits 226 and one of the four major slits 230. In the second illustrated embodiment of the valve 200, the length $L_4$ of each frangible portion 250 is about 0.76 millimeter. The length $L_4$ of each frangible portion 250 may be selected depending on the application of the valve 200, such as (i) the pressures expected to be experienced by the valve head portion 225 during shipping, handling, heating, or (ii) the sizing and forcing capabilities of the probe 102.

It will be understood that due to the increased minimum thickness $T_4$ of each frangible portion 250 of the second embodiment of the valve 200, when compared to the thickness $T_1$ of each frangible portion 150 of the first embodiment of the valve 100, the length $L_4$ of each frangible portion 250 may be reduced significantly (well below 0.76 millimeter) in order to reduce the opening force or pressure differential required to initially open the valve 200. In some applications, the length $L_4$ of each frangible portion 250 may approach zero, leaving only a thin vertical strip of material between the central slits 226 and the major slits 230.

The second illustrated embodiment of the valve 200 is preferably formed from a material that is injection molded as a unitary layer of material, whereby the slits 226, 230, 240 are subsequently cut or stamped into the head portion 225 by suitable special or conventional techniques. The frangible portions 250 are formed by cutting fully through the thickness of the valve head portion 225 to form slits 226 and 230 separated at a specified length $L_4$. Alternatively, the valve 200 can be molded to define the slits 226, 230, 236, the frangible portions 250.

The inventors have found that providing a valve 200 with the frangible portion 250 extending between separated slits in the valve 200 may improve the transportability and/or storage characteristics of a container or other system in which the valve 200 is installed. In particular, the improved valve 200 may eliminate, or at least reduce or minimize, potential undesirable, premature valve opening events or other ingress or egress leakage events during transportation, storage, heating, over-pressurization of the fluent substance container or system in which the valve 200 is installed.

The inventors have found that providing a valve 200 with a frangible portion 250 having a minimum thickness $T_4$ about equal to the minimum thickness of the valve head portion 225 may be more easily or cost effectively manufactured than other embodiments of the inventive valves, such as the first illustrated embodiment of the valve 100 described above.

In one broad aspect of the invention, the inventive valves need only have two slits of any shape or length, separated by a single frangible portion of any shape, thickness, or length in order to initially constrain the valve from opening until subjected to a predetermined pressure differential or opening-force.

In another broad aspect of the invention, the inventive valves need only have one slit of any shape or length, which terminates at a single frangible region of any shape, thickness, or length in order to initially constrain the valve from opening until subjected to a predetermined pressure differential or opening-force.

Figure 19:
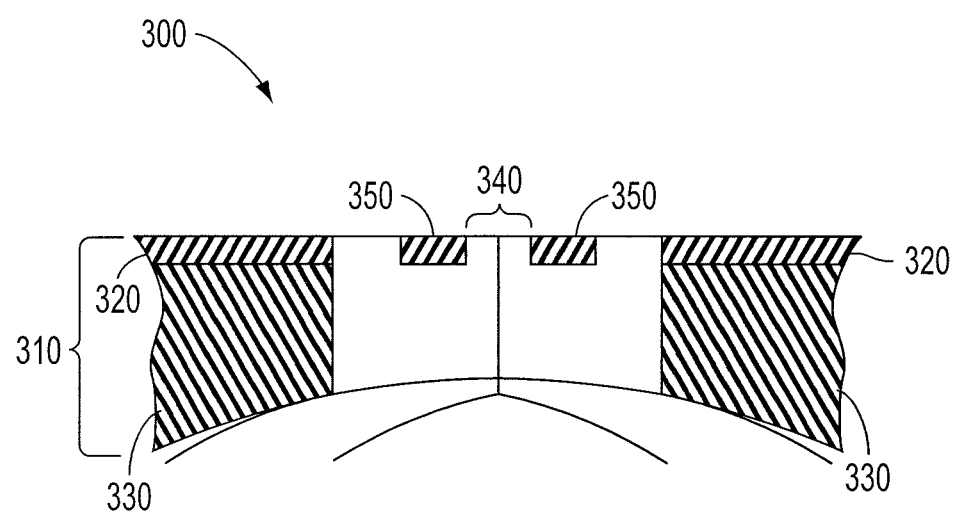
FIG. 19 is a greatly enlarged, fragmentary, cross-sectional view of a portion of a third embodiment of a valve according to the present invention.

A third embodiment of a valve 300 according to the present invention is illustrated in FIG. 19. As will be discussed in detail below, the third illustrated embodiment of the valve 300 functions generally in the same manner as the first illustrated embodiment of the valve 100, in that there are portions of the valve 300 that are designed to initially constrain the opening of valve 300 below a predetermined force or pressure differential acting on or across the valve 300.

With reference to FIG. 19, unlike the first illustrated embodiment of the valve 100, which is formed from a material that is single substance defining a unitary layer of the substance, the third illustrated embodiment of the valve 300 is formed from a material 310 that is defined by multiple layers of different substances—a first layer 320 of a first substance and a second layer 330 of a second substance. Self-sealing slits 340 extend through both layers 320 and 330 of the valve 300 to form a normally closed orifice defined by openable portions of the valve along the slits 340. The openable portions of the orifice are initially constrained from opening by one or more frangible portions 350 functioning in the same manner as the frangible portions 150, 250 discussed above with respect to the first and second embodiments of the valve 100 and 200, respectively. It will be appreciated that in some applications more than two layers of different substances may be used. The substances that make up the layers 320 and 330 may be the same as those substances discussed above with respect to the valve 100. Other suitable substances may be used depending on the application.

It will be appreciated that while various theories and explanations have been set forth herein with respect to how the component configurations and arrangements may affect the operation of the inventive valves, there is no intention to be bound by such theories and explanations. Further it is intended that all structures falling within the scope of the appended claims are not to be otherwise excluded from the scope of the claims merely because the operation of such valves may not be accounted for by the explanations and theories presented herein.

Various modifications and alterations to this invention will become apparent to those skilled in the art without departing from the scope and spirit of this invention. Illustrative embodiments and examples are provided as examples only and are not intended to limit the scope of the present invention.

What is claimed is:

1. A valve (100, 200, 300) for permitting selective communication therethrough, said valve (100, 200, 300) comprising:
   a material having
   I. a first side surface (114, 214) and a second side surface (116, 216) defining between them a thickness of said material;
   II. at least two self-sealing slits (126, 130, 226, 230) each extending through said thickness of said material from said first side surface (114, 214) to said second side surface (116, 216);
   III. at least one frangible portion (150, 250) extending laterally between said at least two slits (126, 130, 226, 230) for at least part of said thickness of said material;
   IV. confronting, openable portions along said at least two slits (126, 130, 226, 230) to define a normally closed orifice to minimize communication through said valve (100, 200, 300) and wherein said openable portions are constrained by said at least one frangible portion (150, 250) from moving away from each other into an open condition for establishing communication through said valve (100, 200);
   wherein one of said at least two self-sealing slits (126, 130, 226, 230) is a central slit (126, 226) and the other of said at least two self-sealing slits (126, 130, 226, 230) is a radially extending major slit (130, 230) that is separated from said central slit (126, 226) by said at least one frangible portion (150, 250);
   wherein said major slit (130, 230) defines a radially outward end from which a pair of intersecting minor slits (140, 240) extends laterally outwardly; and
   wherein each one of said minor slits (140, 240) defines a laterally outward end that terminates at a frangible outer region (160, 260), said head portion (125, 225) has a minimum head thickness ($T_2$) in a central region thereof proximate to a central axle (99), said frangible outer region (160, 260) defines a frangible region thickness ($T_3$), and said minimum head thickness ($T_2$) is at least four times greater than said frangible region thickness ($T_3$).

2. The valve (100, 200, 300) of claim 1 wherein each one of said minor slits (140, 240) defines a minor slit length ($L_2$) and said frangible outer region (160, 260) defines a frangible length ($L_3$), and said frangible length ($L_3$) is at least twice as long as said minor slit length ($L_2$).

3. The valve (100, 300) of claim 2 wherein said first side surface (114) is substantially convex and each said frangible outer region (160) extends along said first side surface (114).

4. A valve (100, 200, 300) for permitting selective communication therethrough, said valve (100, 200, 300) comprising:
   a material having a first side surface (114, 214) and a second side surface (116, 216) defining between them a thickness of said material, said material defining
   I. an annular, peripheral attachment portion (120, 220);
   II. a flexible, annular, intermediate portion (124, 222) extending laterally from said peripheral attachment portion (120); and
   III. a flexible, head portion (125, 225) extending laterally from said flexible, annular, intermediate portion (124, 222), said head portion (125, 225) including
      a. a pair of self-sealing, intersecting central slits (126, 226) transversely extending through said head portion (125, 225),
      b. four radially extending major slits (130, 230) transversely extending through said head portion (125, 225), each one of said major slits (130, 230) separated from one of said pair of self-sealing, intersecting central slits (126, 226) by a frangible portion (150, 250), and
      c. a pair of intersecting minor slits (140, 240) each extending (i) transversely through said head portion (125, 225), and (ii) laterally outwardly from one of said major slits (130, 230), each one of said minor slits (140, 240) terminating at a frangible outer region (160, 260) having a thickness less than the thickness of said material.

\* \* \* \* \*